(12) United States Patent
Kiyokawa (10) Patent No.: US 12,139,347 B2
(45) Date of Patent: Nov. 12, 2024

(54) ARTICLE TRANSPORT FACILITY

(71) Applicant: Daifuku Co., Ltd., Osaka (JP)

(72) Inventor: Wataru Kiyokawa, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 91 days.

(21) Appl. No.: 18/012,490

(22) PCT Filed: Feb. 22, 2021

(86) PCT No.: PCT/JP2021/006629
§ 371 (c)(1),
(2) Date: Dec. 22, 2022

(87) PCT Pub. No.: WO2021/261011
PCT Pub. Date: Dec. 30, 2021

(65) Prior Publication Data
US 2023/0257211 A1    Aug. 17, 2023

(30) Foreign Application Priority Data

Jun. 23, 2020 (JP) ................. 2020-107685

(51) Int. Cl.
*B65G 47/52* (2006.01)
*B65G 37/00* (2006.01)

(52) U.S. Cl.
CPC .......... *B65G 47/52* (2013.01); *B65G 37/005* (2013.01); *B65G 2207/14* (2013.01)

(58) Field of Classification Search
CPC .. B65G 47/52; B65G 37/005; B65G 2207/14; B65G 15/10; B65G 47/20; B65G 17/26; B65G 15/12; B65G 2201/02; B65G 2812/017

USPC .......................................................... 198/373
See application file for complete search history.

(56) References Cited

U.S. PATENT DOCUMENTS

| 4,665,832 A | * | 5/1987 | Kobayashi | ............. B62D 65/18 |
| | | | | 104/165 |
| 2004/0083901 A1 | * | 5/2004 | Dove | .................... B65G 47/66 |
| | | | | 99/404 |

FOREIGN PATENT DOCUMENTS

| JP | 6175428 U | | 5/1986 |
| JP | 4107722 U | | 9/1992 |
| JP | H04107722 U | * | 9/1992 |
| JP | 10139149 A | * | 5/1998 |
| JP | 201222560 A | | 2/2012 |
| JP | 2012022560 A | * | 2/2012 |

\* cited by examiner

*Primary Examiner* — Gene O Crawford
*Assistant Examiner* — Muhammad Awais
(74) *Attorney, Agent, or Firm* — The Webb Law Firm (57) ABSTRACT

A middle guide is located between a first transporter and a second transporter in a width direction in an area of a conveyor device extending in a transportation direction including a joint connecting to a support conveying device to guide a bottom middle portion of a bottom surface, and the bottom middle portion is a portion of the bottom surface between a bottom first portion and a bottom second portion in the width direction. The middle guide has a middle guide surface to guide the bottom middle portion, and the middle guide surface is located in a reference plane at the joint and inclined further downward at a greater distance from the joint.

7 Claims, 5 Drawing Sheets

ARTICLE TRANSPORT FACILITY

CROSS-REFERENCE TO RELATED APPLICATIONS

This application is the United States national phase of International Application No. PCT/JP2021/006629 filed Feb. 22, 2021, and claims priority to Japanese Patent Application No. 2020-107685 filed Jun. 23, 2020, the disclosures of which are hereby incorporated by reference in their entireties.

BACKGROUND OF THE INVENTION

Field of the Invention

The present invention relates to an article transport facility, and particularly, to an article transport facility for transporting articles while supporting the articles from below.

Description of Related Art

For example, Japanese Unexamined Patent Application Publication No. 2012-022560 (Patent Literature 1) describes an article transport facility including a conveyor device for transporting articles while supporting the articles from below. Reference signs in parentheses used hereafter in describing the background are the reference signs in Patent Literature 1.

The conveyor device described in Patent Literature 1 includes three chain conveyors (10a, 10b, and 10c) arranged in a transportation direction in which articles are transported. Each of the three chain conveyors (10a, 10b, and 10c) includes a pair of side frames (11) spaced apart from each other in the width direction, and chains (19) located at the pair of side frames (11) to transport articles while supporting the articles from below. Each article transported by the conveyor device has both ends of its bottom surface in the width direction supported by the chains (19) from below. The article bottom surface has a middle portion in the width direction suspended without being supported by the chains (19). The articles transported by the conveyor device in this state are transferred between the three chain conveyors (10a, 10b, and 10c).

Patent Literature 1: Japanese Unexamined Patent Application Publication No. 2012-022560

When the article is supported at simply both ends of the article bottom surface in the width direction, the middle portion of the article bottom surface in the width direction slightly bends downward due to the weight of the article or the load imposed on the article. Particularly when the article has a large weight or bears a high load, the article bends more. With the technique in Patent Literature 1, each of the three chain conveyors (10a, 10b, and 10c) supports the articles at simply both ends of the article bottom surface in the width direction. Thus, the technique enables smooth transfer of the articles between the chain conveyors (10a, 10b, and 10c) adjacent to one another while the middle portion of the article bottom surface in the width direction is bending downward. However, when the article is to be transferred from the chain conveyors (10a, 10b, and 10c) to a conveying device that supports the article with a higher degree of flatness than the chain conveyors (10a, 10b, and 10c), for example, a roller conveyor that supports the article from below throughout the article bottom surface in the width direction, the bent article bottom surface may obstruct smooth transfer of the article.

SUMMARY OF THE INVENTION

In response to the above issue, a technique is awaited for smoothly transporting articles, at an article transport facility for transporting articles while supporting the articles from below, between a conveying device that supports the articles with a high degree of flatness and a conveying device that transports the articles partially bending downward.

An article transport facility transports a target article to be transported in a transportation direction. The facility includes a conveyor device that transports the target article, and a support conveying device adjacent to the conveyor device in the transportation direction to transport the target article while supporting the target article with a higher degree of flatness than the conveyor device. The conveyor device includes a first transporter, a second transporter, and a middle guide each extending in the transportation direction and spaced apart from one another in a width direction being a direction perpendicular to the transportation direction in a plan view. The width direction includes a first width direction in which the first transporter is located from the second transporter, and a second width direction opposite to the first width direction. The first transporter transports the target article in the transportation direction while supporting, from below, a bottom first portion of a bottom surface of the target article, and the bottom first portion is a portion of the bottom surface in the width direction. The second transporter transports the target article in the transportation direction while supporting, from below, a bottom second portion of the bottom surface of the target article, and the bottom second portion is a portion of the bottom surface located in the second width direction from the bottom first portion. The middle guide has a full length in the transportation direction shorter than a full length of each of the first transporter and the second transporter in the transportation direction. The middle guide is located between the first transporter and the second transporter in the width direction in an area of the conveyor device extending in the transportation direction including a joint connecting to the support conveying device to guide a bottom middle portion of the bottom surface, and the bottom middle portion is a portion of the bottom surface between the bottom first portion and the bottom second portion in the width direction. The first transporter has a first support surface to support the bottom first portion, and the second transporter has a second support surface to support the bottom second portion. The first support surface and the second support surface are located in a same reference plane. The middle guide has a middle guide surface to guide the bottom middle portion, and the middle guide surface is located in the reference plane at the joint and inclined further downward from the reference plane at a greater distance in the transportation direction from the joint.

In the conveyor device including the first and second transporters described above, the middle bottom surface of the target article is supported by neither the first support surface of the first transporter nor the second support surface of the second transporter. Thus, depending on, for example, the weight or the strength of the target article, the bottom middle portion may bend downward below the reference plane including the first and second support surfaces. In this structure, the middle guide surface that guides the bottom middle portion is inclined further downward from the reference plane at a greater distance in the transportation direction from the joint in the conveyor device connecting to the support conveying device. When the target article moves over the conveyor device toward the support conveying device, the bottom middle portion of the target article comes in contact with the middle guide surface at a predetermined distance apart from the joint, and is gradually pressed upward as moving toward the joint. At the joint, the middle guide surface is located in the reference plane as the first and second support surfaces. Thus, when the target article passes the joint, the bottom middle portion is unbent. The article transport facility with this structure for transporting the target article while supporting the target article from below can thus smoothly transfer the target article between the conveying device that transports the target article partially bending downward and the conveying device that supports the target article with a high degree of flatness.

In this structure, the middle guide has a full length in the transportation direction shorter than the full length of each of the first and second transporters in the transportation direction. Thus, the middle guide is located simply partially in the conveyor device including the first and second transporters in the transportation direction. This structure more easily lowers the cost than, for example, a structure that includes a third transporter having the structure similar to that of the first and second transporters and located throughout the length of the conveyor device in the transportation direction between the first and second transporters in the width direction.

Further aspects and features of the technique according to the present disclosure will be apparent from exemplary and nonlimiting embodiments described below with reference to the drawings.

DESCRIPTION OF THE INVENTION

Figure 1:
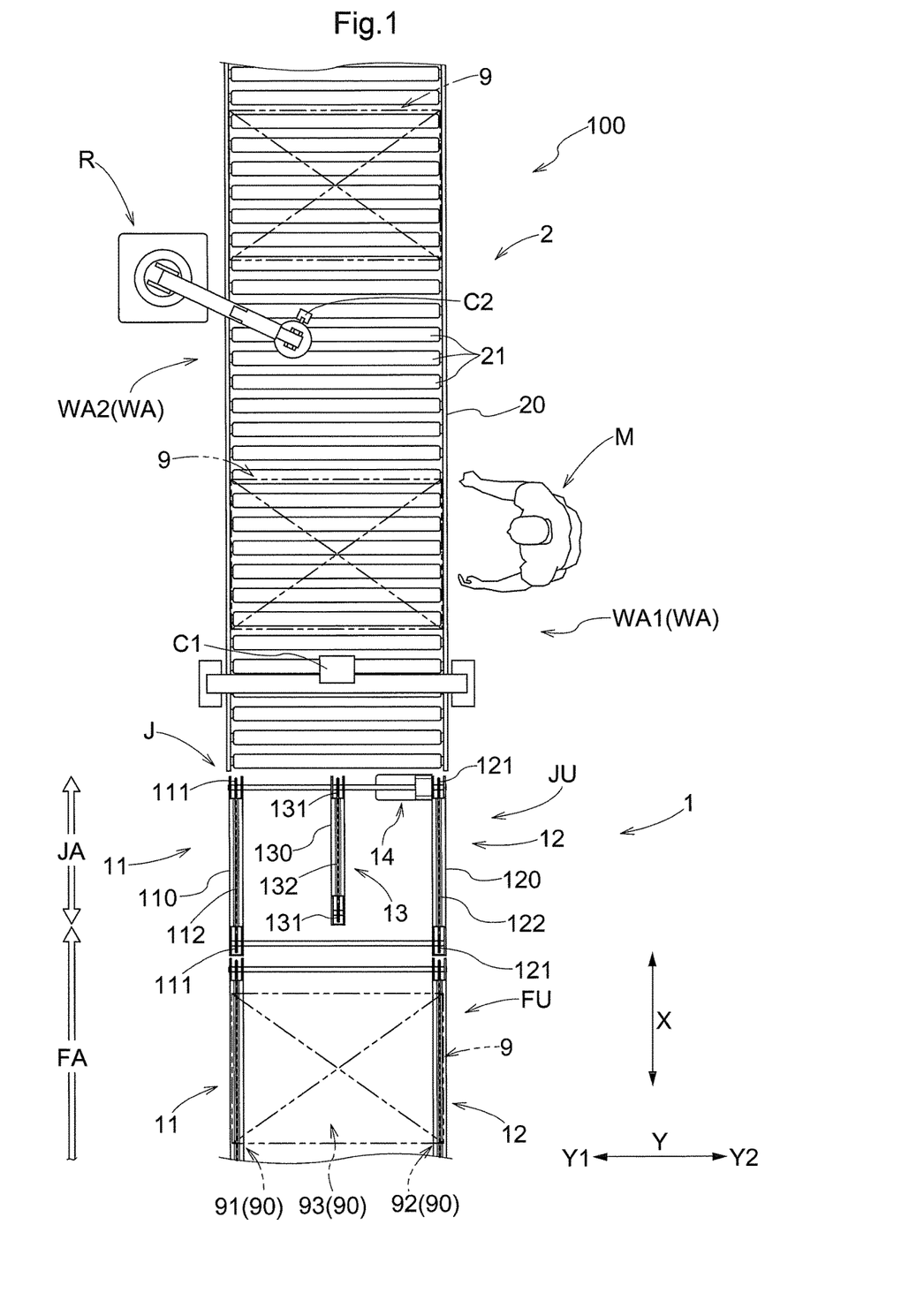
FIG. 1 is a partial plan view of an article transport facility.

An article transport facility according to an embodiment will be described with reference to the drawings. As shown in FIG. 1, an article transport facility 100 transports target articles 9 in a transportation direction X.

Hereafter, the direction in which the target articles 9 are transported is referred to as a transportation direction X, and the direction perpendicular to the transportation direction X in a plan view is referred to as a width direction Y. The width direction Y includes a first width direction Y1 and a second width direction Y2 that are opposite to each other.

Figure 2:
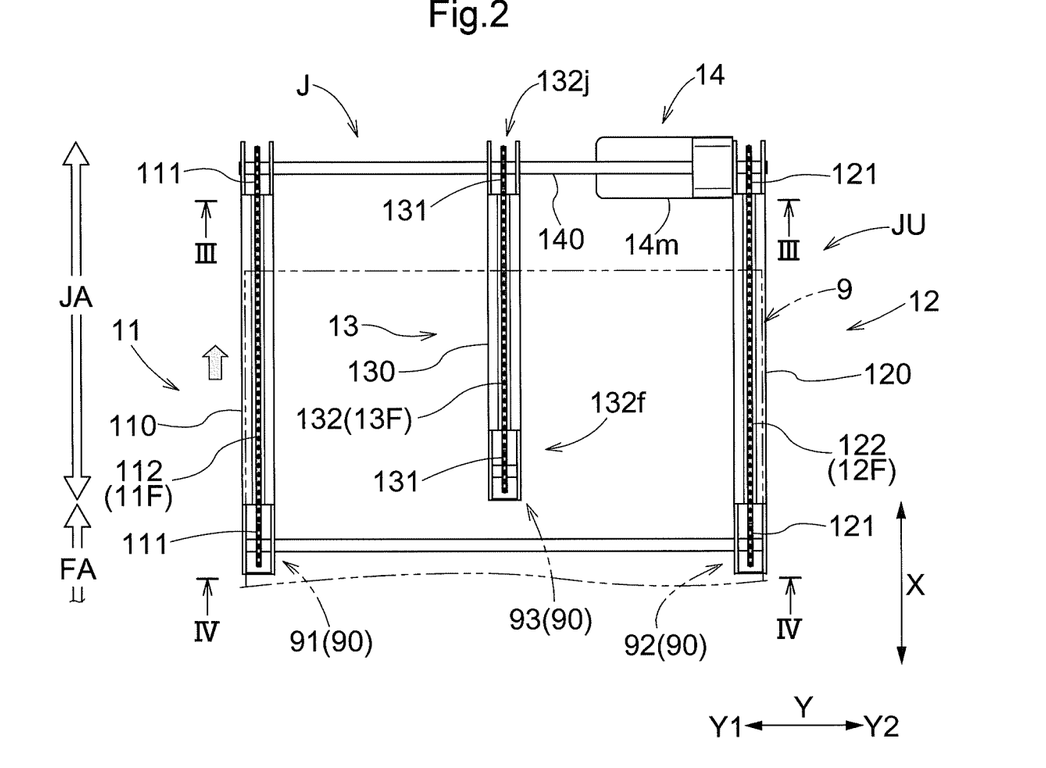
FIG. 2 is a plan view of the periphery of a joint.
Figure 3:
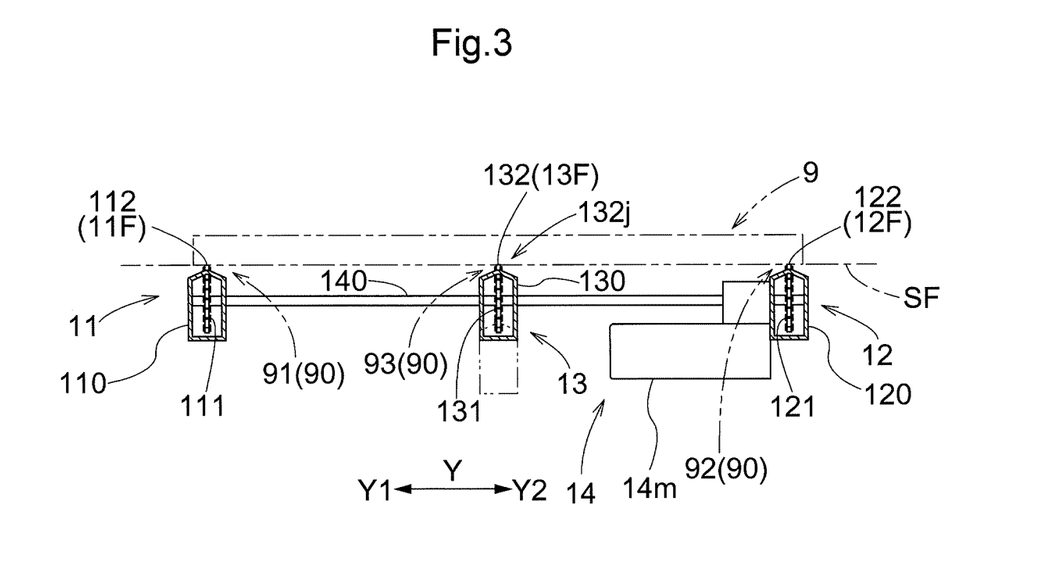
FIG. 3 is a cross-sectional view of the periphery of the joint taken along line III-III in FIG. 2.
Figure 4:
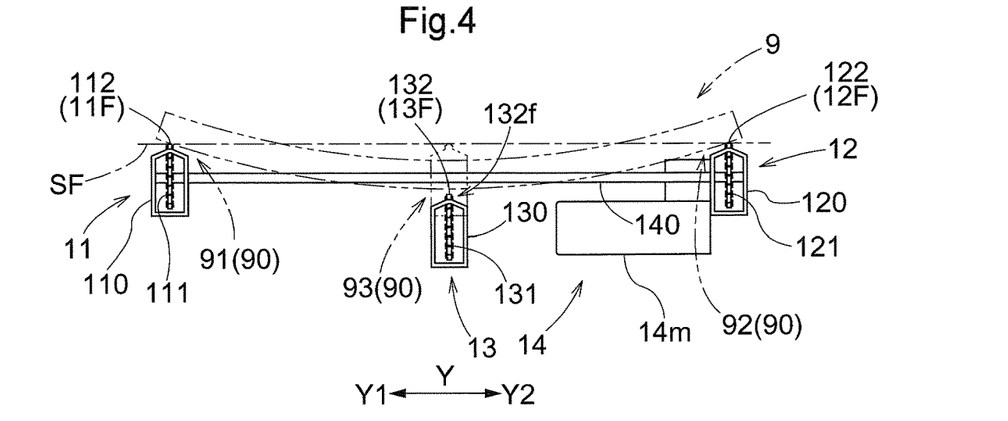
FIG. 4 is a cross-sectional view of the periphery of the joint taken along line IV-IV in FIG. 2 as viewed in the direction indicated by arrows.

Each target article 9 is, for example, a pallet or a container accommodating products to undergo picking or sorting, or accommodating workpieces or finished products. In the present embodiment, the target articles 9 are pallets. Although not illustrated in detail, the pallets serving as the target articles 9 receive multiple products. Each target article 9 is transported with its bottom surface 90 supported. As shown in FIGS. 2 to 4, in the example described below, the bottom surface 90 of the target article 9 has a bottom first portion 91 in the width direction Y, a bottom second portion 92 located farther in the second width direction Y2 from the bottom first portion 91, and a bottom middle portion 93 between the bottom first portion 91 and the bottom second portion 92 in the width direction Y.

As shown in FIG. 1, the article transport facility 100 includes a conveyor device 1 that transports the target articles 9, and a support conveying device 2 located adjacent to the conveyor device 1 in the transportation direction X to transport the target articles 9 while supporting the target articles 9 with a higher degree of flatness than the conveyor device 1.

The degree of flatness herein refers to a deviation of the bottom surface 90 of each target article 9 from a geometrically correct plane. The bottom surface 90 with a high degree of flatness refers to the bottom surface 90 of the target article 9 more approximate to the geometrically correct plane than in a comparative example. In the article transport facility 100, the bottom surface 90 of the target article 9 transported by the support conveying device 2 is more approximate to the geometrically correct plane than the bottom surface 90 of the target article 9 transported by the conveyor device 1. When the bottom surface 90 has a higher degree of flatness, the transport plane that supports the target article 9 during transportation and the bottom surface 90 of the target article 9 is more highly parallel than when the bottom surface 90 is supported with a lower degree of flatness.

The support conveying device 2 transports the target articles 9 while supporting the bottom surfaces 90 of the target articles 9 from below. In the present embodiment, the support conveying device 2 is a roller conveyor. The support conveying device 2 includes rollers 21 that support the bottom surfaces 90 of the target articles 9, a support frame 20 that supports the rollers 21, and a driving device (not shown) that drives the rollers 21 to rotate. More specifically, the support conveying device 2 includes multiple rollers 21 arranged adjacent to one another in the transportation direction X. The multiple rollers 21 extend throughout an area of the bottom surfaces 90 of the target articles 9 in the width direction Y, and rotate about rotation axes extending in the width direction Y. The rotation axes of the multiple rollers 21 are located in one reference plane. The multiple rollers 21 are cylinders with the circumferential surfaces with the same radius throughout them in the width direction Y. Thus, an imaginary transport plane defined by connecting the upper ends of the rollers 21 is approximate to the plane parallel to the reference plane. The support conveying device 2 can thus transport the target articles 9 while supporting the bottom surfaces 90 of the target articles 9 with a higher degree of flatness than the conveyor device 1 (described below).

In the present embodiment, as shown in FIG. 1, the support conveying device 2 is located in a work area WA in which operations are performed on the target articles 9. In this example, the operations performed on the target articles 9 include various operations performed on multiple products on the pallets (target articles 9).

In the present embodiment, the work area WA includes an inspection area WA1 in which products undergo inspection, and a picking area WA2 in which products are picked. These operation areas are mere examples. The work area WA may also include other operation areas for performing operations other than inspection or picking.

In the inspection area WA1, an inspection imaging device C1 is located. The inspection imaging device C1 images, from above, the target articles 9 supported by the support conveying device 2. In other words, the inspection imaging device C1 performs an image recognition operation on products on the pallets (target articles 9) in the inspection area WA1. The image recognition operation includes identification of the type, the number, or the arrangement of the products on the pallets (target articles 9), or determination as to whether each product has any damage.

In the present embodiment, an operator M inspects the target articles 9 in the inspection area WA1. More specifically, the operator M inspects or checks the products on the pallets (target articles 9). For example, the operator M stays downstream from the inspection imaging device C1 in the transportation direction X to check the inspection results of the image recognition operation performed by the inspection imaging device C1. More specifically, in this case, the operator M additionally checks the type, the number, or the arrangement of the products on the pallets (target articles 9), or checks each product for any damage.

In the picking area WA2, a robot R that picks the target articles 9 is located. In other words, in the picking area WA2, the robot R picks products on the pallets (target articles 9). In the present embodiment, a picking imaging device C2 that performs an image recognition operation on products that are to be picked by the robot R is also located in the picking area WA2. The picking imaging device C2 performs the image recognition operation on the products on the pallets (target articles 9) from above the area in which the picking operation is performed by the robot R. The image recognition operation includes identification of the type, the number, and the arrangement of the products on each pallet (target article 9). In the picking operation, the robot R picks the products on each pallet (target article 9) based on the image identification results of the products performed by the picking imaging device C2 and picking information. The picking information is set based on, for example, the type or the destination of the product.

In the illustrated example, the robot R is located adjacent to the support conveying device 2 in the width direction Y. The robot R operates its arm based on the arrangement of the products on each pallet (target article 9) determined from the image captured by the picking imaging device C2, and performs picking from above the target article 9. In this state, as described above, the support conveying device 2 transports the target articles 9 while supporting the target articles 9 with a higher degree of flatness, and thus the products on the pallets (target articles 9) are inclined less during the picking operation. Thus, the robot R can easily perform the picking operation highly accurately on such products on the pallets (target articles 9).

In the illustrated example, the inspection imaging device C1 and the picking imaging device C2 are located above the support conveying device 2 to image the target articles 9 with the support conveying device 2 in the background. In the image recognition operation performed by the inspection imaging device C1 and the picking imaging device C2, when the pallets (target articles 9) are transported with a lower degree of flatness, the products on the pallets may be inclined or deformed, causing the image recognition operation to be less accurate. However, as described above, the support conveying device 2 can support and transport the target articles 9 with a higher degree of flatness, and thus the image recognition operation is performed on the target articles 9 highly accurately. The image recognition operation may be less accurate due to, for example, light reflected from the rollers 21 on the images captured by the inspection imaging device C1 or the picking imaging device C2. The support conveying device 2 may then include, for example, the rollers 21 with surfaces less likely to cause such light reflection or a belt conveyor instead of the rollers 21.

The conveyor device 1 has the structure different from the structure of the support conveying device 2. The conveyor device 1 transports each target article 9 while supporting both the bottom first portion 91 and the bottom second portion 92 of the target article 9 from below (refer to FIGS. 3 and 4).

As shown in FIG. 1, the conveyor device 1 is adjacent to the support conveying device 2 in the transportation direction X. The conveyor device 1 includes a joint J connecting to the support conveying device 2. More specifically, the joint J and the support conveying device 2 are spaced with a small gap between them in the transportation direction X. When each target article 9 is transported from the conveyor device 1 to the support conveying device 2, the target article 9 passes the joint J in the conveyor device 1, and is then transferred from the conveyor device 1 to the support conveying device 2. Thereafter, the target article 9 is transported to a place for the corresponding operation. Conversely, the target article 9 may be transported from the support conveying device 2 to the conveyor device 1 in the article transport facility 100. In that case, the target article 9 is transferred from the support conveying device 2 to the joint J in the conveyor device 1.

As described above, the article transport facility 100 according to the present embodiment can transport the target article 9 in opposite directions in the transportation direction X. The article transport facility 100 with the structure described below transports the target article 9 from the conveyor device 1 to the support conveying device 2. Thus, transporting the target articles 9 in the transportation direction X described below refers to transporting the target articles 9 from the conveyor device 1 to the support conveying device 2 in the transportation direction X.

As shown in FIG. 2, the conveyor device 1 includes a first transporter 11, a second transporter 12, and a middle guide 13 extending in the transportation direction X and spaced apart from one another in the width direction Y. The first width direction Y1 defined above is a direction in which the first transporter 11 is located from the second transporter 12 in the width direction Y. The second width direction Y2 is opposite to the first width direction Y1. Specifically, the first width direction Y1 is a direction in which the first transporter 11 is located from the second transporter 12 in the width direction Y, and the second width direction Y2 is opposite to the first width direction Y1.

The first transporter 11 transports each target article 9 in the transportation direction X while supporting the bottom first portion 91 of the target article 9 from below. The second transporter 12 transports the target article 9 in the transportation direction X while supporting the bottom second portion 92 of the target article 9 from below.

In the present embodiment, the first transporter 11 and the second transporter 12 are chain conveyors. More specifically, the first transporter 11 includes a pair of first sprockets 111 (examples of rotators) that are spaced apart from each other in the transportation direction X and rotate about rotation axes extending in the width direction Y, and a first chain 112 (an example of an endless body) wound around the pair of first sprockets 111 and extending in the transportation direction X. The first chain 112 defines a first support surface 11F that supports the bottom first portion 91 of each target article 9 from below. Similarly, the second transporter 12 includes a pair of second sprockets 121 (examples of rotators) that are spaced apart from each other in the transportation direction X and rotate about rotation axes in the width direction Y, and a second chain 122 (an example of an endless body) wound around the pair of second sprockets 121 and extending in the transportation direction X. The second chain 122 defines a second support surface 12F that supports the bottom second portion 92 of each target article 9 from below. The first support surface 11F of the first chain 112 and the second support surface 12F of the second chain 122 actually have unevenness resulting from the unevenness of the chains, but are herein defined as ideal flat planes extending in the direction in which the chains extend.

Figure 5:
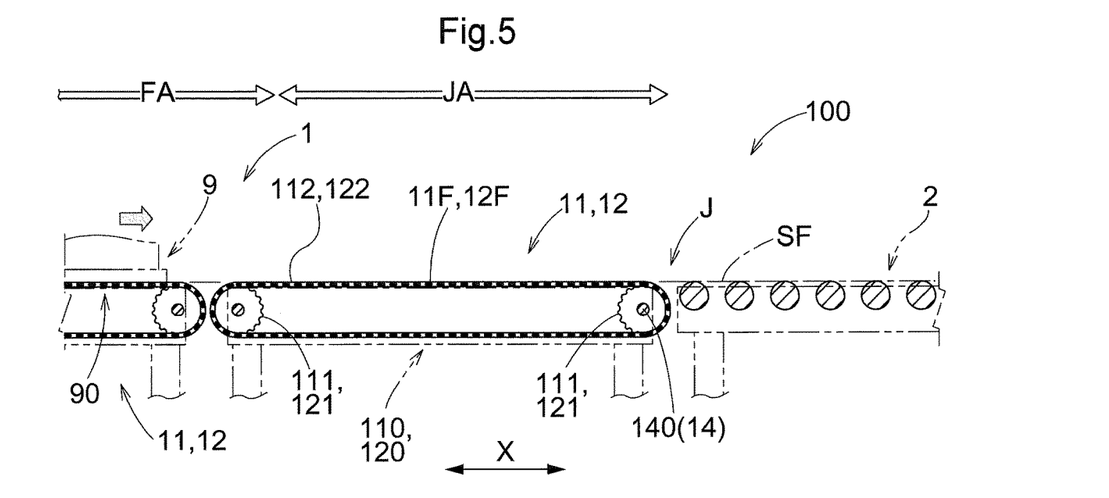
FIG. 5 is a view of a first transporter or a second transporter as viewed in the width direction.

As shown in FIG. 5, the first transporter 11 in the present embodiment includes a first support frame 110. The first support frame 110 supports the pair of first sprockets 111 and the first chain 112 wound around the pair of first sprockets 111. In the present embodiment, the first support frame 110 supports the pair of first sprockets 111 spaced apart from each other in the transportation direction X at the same height. In the present example, the first support frame 110 supports the first chain 112 in the transportation direction X to retain each portion of the first support surface 11F in the transportation direction X at the same height. The first support surface 11F is straight as viewed in the width direction Y.

In the present embodiment, the first transporter 11 includes multiple sets of the first support frame 110, the first sprockets 111, and the first chain 112 supported by the first support frame 110. The multiple sets are arranged in the transportation direction X (also refer to FIG. 1). In other words, the first support frames 110 each supporting the first sprockets 111 and the first chain 112 are arranged in the transportation direction X.

In the present embodiment, the second transporter 12 includes a second support frame 120. The second support frame 120 supports the pair of second sprockets 121 and the second chain 122 wound around the pair of second sprockets 121. In the present embodiment, the second support frame 120 supports the pair of second sprockets 121 spaced apart from each other in the transportation direction X at the same height. In the present example, the second support frame 120 supports the second chain 122 in the transportation direction X to retain each portion of the second support surface 12F in the transportation direction X at the same height. The second support surface 12F is straight as viewed in the width direction Y.

In the present embodiment, the second transporter 12 includes multiple sets of the second support frame 120, the second sprockets 121, and the second chain 122 supported by the second support frame 120. The multiple sets are arranged in the transportation direction X (also refer to FIG. 1). In other words, the second support frames 120 each supporting the second sprockets 121 and the second chain 122 are arranged in the transportation direction X.

As shown in FIGS. 3 to 5, the first support surface 11F of the first transporter 11 that supports the bottom first portion 91 and the second support surface 12F of the second transporter 12 that supports the bottom second portion 92 are located in the same reference plane SF. In the present embodiment, the reference plane SF is an imaginary plane and extends in the horizontal direction as viewed in the transportation direction parallel to the transportation direction X. Thus, the first support surface 11F and the second support surface 12F are located at the same height. In the present example, the reference plane SF extends in the horizontal direction as viewed in the width direction parallel to the width direction Y. Thus, the first support surface 11F and the second support surface 12F are located at the same height throughout them in the transportation direction X.

As shown in FIGS. 2 to 4, the middle guide 13 is located between the first transporter 11 and the second transporter 12 in the width direction Y. In the present embodiment, the middle guide 13 is located at the middle of the distance between the first transporter 11 and the second transporter 12 in the width direction Y. In other words, in the width direction Y, the distance between the middle guide 13 and the first transporter 11 is equal to the distance between the middle guide 13 and the second transporter 12. The middle guide 13 guides the bottom middle portion 93 between the bottom first portion 91 and the bottom second portion 92 of the bottom surface 90 of the target article 9 in the width direction Y.

As shown in FIG. 1, the middle guide 13 is located in an area in the conveyor device 1 extending in the transportation direction X including the joint J that connects to the support conveying device 2. Hereafter, an area in the conveyor device 1 extending in the transportation direction X in which the middle guide 13 is located is referred to as a joint area JA, and an area in the conveyor device 1 farther from the joint J than the joint area JA is referred to as a far area FA. In the present embodiment, the middle guide 13 is located simply in the joint area JA, not in the far area FA. In contrast, the first transporter 11 and the second transporter 12 are located on both the joint area JA and the far area FA. The middle guide 13 thus has a full length in the transportation direction X shorter than the full length of each of the first transporter 11 and the second transporter 12 in the transportation direction X.

As shown in FIGS. 2 to 4, the middle guide 13 in the present embodiment transports the target article 9 in the transportation direction X while supporting the bottom middle portion 93 from below. In the present example, the middle guide 13 is a chain conveyor. More specifically, the middle guide 13 includes a pair of middle sprockets 131 (examples of rotators) that are spaced apart from each other in the transportation direction X and rotate about rotation axes extending in the width direction Y, and a middle chain 132 (an example of an endless body) wound around the pair of middle sprockets 131 and extending in the transportation direction X. The middle chain 132 defines a middle guide surface 13F that guides the bottom middle portion 93 of the target article 9. The middle guide surface 13F is at least partially in contact with the bottom middle portion 93 from below.

Figure 6:
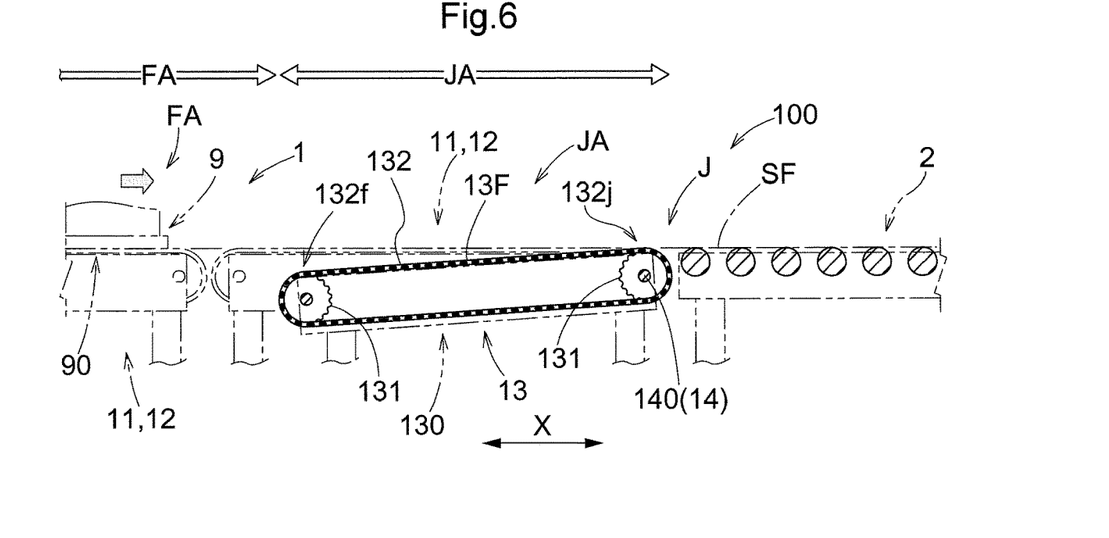
FIG. 6 is a view of a middle guide as viewed in the width direction.

As shown in FIG. 6, the middle guide 13 in the present embodiment includes a middle support frame 130. The middle support frame 130 supports the pair of middle sprockets 131 and the middle chain 132 wound around the pair of middle sprockets 131. The middle guide surface 13F of the middle guide 13 is inclined further downward from the reference plane SF at a greater distance in the transportation direction X from the joint J. As shown in FIG. 3, the middle guide surface 13F is located in the reference plane SF at the joint J. As described above, in the present embodiment, the reference plane SF extends in the horizontal direction as viewed in the width direction. The middle support frame 130 supports the pair of middle sprockets 131 spaced apart from each other in the transportation direction X at different heights. More specifically, the middle support frame 130 supports one of the middle sprockets 131 of the pair located nearer the joint J in the transportation direction X at a higher position than the other middle sprocket 131 at the opposite end. More specifically, the middle guide surface 13F has a joint end 132j or the end nearest the joint J in the transportation direction X located at a higher position than a far end 132f or the end farthest from the joint J in the transportation direction X. In the present embodiment, one of the middle sprockets 131 of the pair located nearer the joint J in the transportation direction X is located at the same height as the first sprocket 111 and the second sprocket 121 located nearer the joint J. Thus, the first support surface 11F of the first transporter 11, the second support surface 12F of the second transporter 12, and the middle guide surface 13F of the middle guide 13 are located in the same reference plane SF nearer the joint J. In the present example, the middle guide surface 13F is straight as viewed in the width direction Y (refer to FIG. 6).

Figure 7:
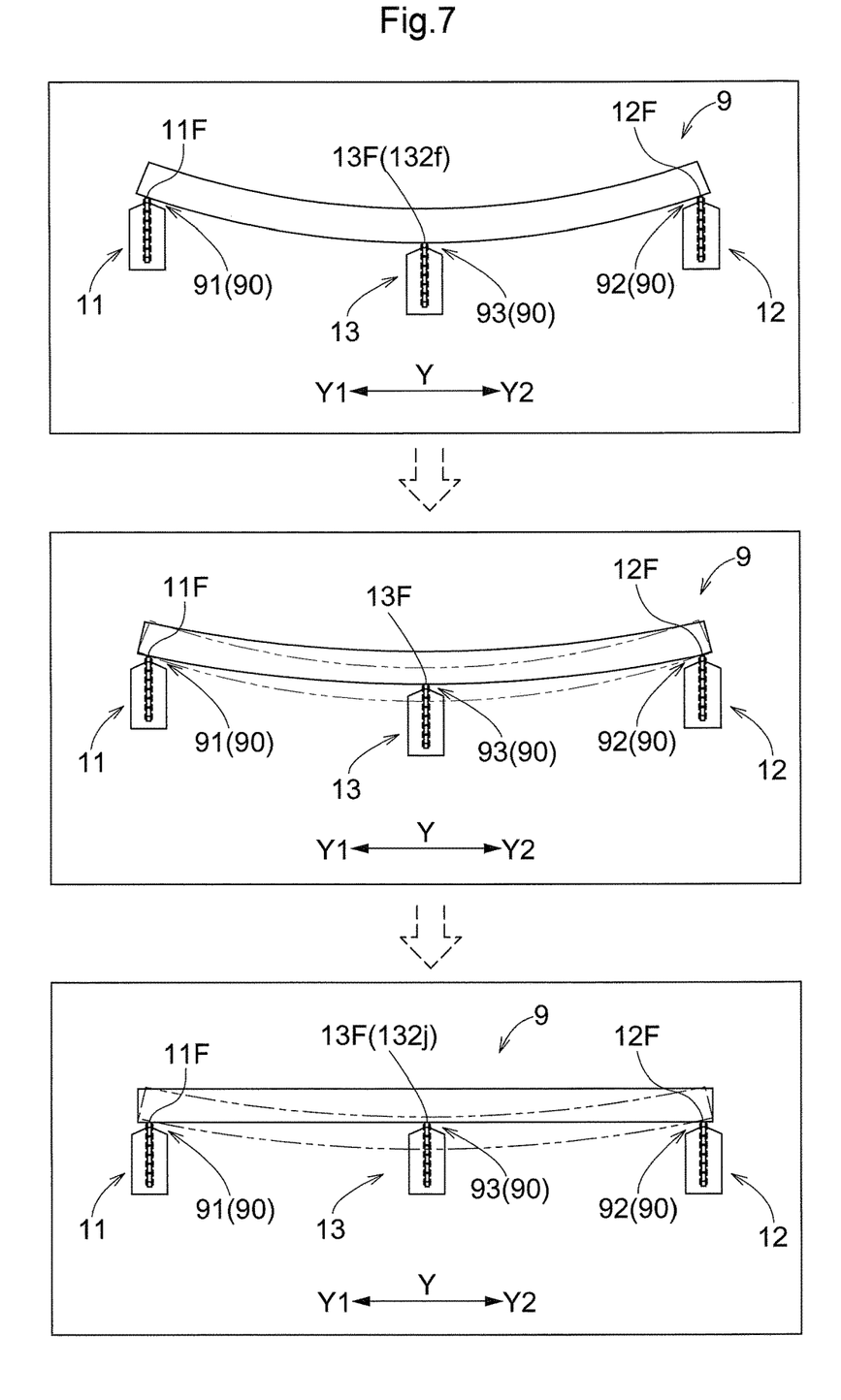
FIG. 7 is a diagram of a target article during transportation.

As shown in FIG. 1, in the far area FA in which the middle guide 13 is not located, the bottom middle portion 93 of the target article 9 is supported by neither the first support surface 11F of the first transporter 11 nor the second support surface 12F of the second transporter 12. Thus, as shown in FIG. 4, depending on, for example, the weight of the products on each target article 9 (each pallet) or the strength of the target article 9 (the pallet), the bottom middle portion 93 may bend downward below the reference plane SF including the first support surface 11F and the second support surface 12F. However, as described above, in the conveyor device 1, the middle guide surface 13F that guides the bottom middle portion 93 is inclined further downward from the reference plane SF at a greater distance in the transportation direction X from the joint J in the conveyor device 1 connecting to the support conveying device 2 (refer to FIG. 6). Thus, when the target article 9 moves over the conveyor device 1 toward the support conveying device 2, the bottom middle portion 93 of the target article 9 comes in contact with the middle guide surface 13F at a predetermined distance apart from the joint J. As shown in FIG. 7, the bottom middle portion 93 of the target article 9 is gradually pressed upward as being transported toward the joint J. As described above, at the joint J, the middle guide surface 13F is located in the same reference plane SF as the first support surface 11F and the second support surface 12F. Thus, when the target article 9 passes the joint J, the bottom middle portion 93 is unbent, as shown in the lowest portion in FIG. 7. Thus, the article transport facility 100 can smoothly transfer the target article 9 between the conveyor device 1 that transports the target article 9 partially bending downward and the support conveying device 2 that supports the target article 9 with a high degree of flatness.

As shown in FIG. 4, in the present embodiment, the far end 132f of the middle guide surface 13F is located below the bottom middle portion 93 of the target article 9 when the target article 9 supported by the first transporter 11 and the second transporter 12 has the bottom middle portion 93 bending downward below the bottom first portion 91 and the bottom second portion 92. Thus, the bottom middle portion 93 of the target article 9 transported toward the support conveying device 2 first comes in contact with the portion of the middle guide surface 13F nearer the joint J than the far end 132f, or in other words, an inclined portion of the middle guide surface 13F. Thus, the bottom middle portion 93 of the target article 9 bending downward can be guided appropriately. In the present embodiment, the position (height) of the bottom middle portion 93 is calculated based on a maximum bent of the target article 9 bearing an expected maximum load, and the far end 132f of the middle guide surface 13F is located below the position of the bottom middle portion 93. In the present example, the target article 9 (the pallet) bears the maximum load when receiving a product with a maximum expected weight.

In the present embodiment, as shown in FIGS. 2 to 4, the conveyor device 1 includes a driving device 14 that drives the first transporter 11, the second transporter 12, and the middle guide 13. The driving device 14 synchronously drives the first transporter 11, the second transporter 12, and the middle guide 13.

In the present embodiment, the driving device 14 includes a connecting shaft 140 that coaxially connects rotators located at ends of the first transporter 11, the second transporter 12, and the middle guide 13 nearer the joint J, or in this example, the first sprocket 111, the second sprocket 121, and the middle sprocket 131 to one another, and a driver 14m that drives the connecting shaft 140 to rotate.

The connecting shaft 140 extends in the width direction Y through the first sprocket 111, the second sprocket 121, and the middle sprocket 131 located at the same height, or more specifically, overlapping one another as viewed in the width direction Y. The first sprocket 111, the second sprocket 121, and the middle sprocket 131 are fixed to the connecting shaft 140 to rotate integrally with the connecting shaft 140. Thus, when the driver 14m drives the connecting shaft 140 to rotate, the first sprocket 111, the second sprocket 121, and the middle sprocket 131 rotate synchronously. In the present example, the first sprocket 111, the second sprocket 121, and the middle sprocket 131 have the same diameter. Thus, the first chain 112 wound around the first sprockets 111, the second chain 122 wound around the second sprockets 121, and the middle chain 132 wound around the middle sprockets 131 are driven at the same rate by the rotation of the connecting shaft 140. The driver 14m includes, for example, an electric motor and a reduction gear that reduces the rotation of the electric motor to transmit the reduced rotation to the connecting shaft.

As described above with reference to FIG. 1, the full length of the middle guide 13 in the transportation direction X is shorter than the full length of each of the first transporter 11 and the second transporter 12 in the transportation direction X. When multiple first transporters 11 and multiple second transporters 12 are arranged in the transportation direction X, the full length of the first transporters 11 or the second transporters 12 in the transportation direction X is the total length of the multiple first transporters 11 or the multiple second transporters 12 in the transportation direction X. The article transport facility 100 at which the full length of the middle guide 13 in the transportation direction X is shorter than the full length of each of the first transporter 11 and the second transporter 12 in the transportation direction X lowers the cost. More specifically, when the conveyor device 1 including the first transporter 11 and the second transporter 12 includes a third transporter (not shown) having the same structure as the first transporter 11 and the second transporter 12 (when the conveyor device 1 includes a three-row conveyor) between the first transporter 11 and the second transporter 12 in the width direction Y throughout the length in the transportation direction X, the third transporter has the structure and the size similar to those of the first transporter 11 and the second transporter 12. However, the structure according to the present embodiment does not include such a third transporter, but includes the middle guide 13 located simply partially in the transportation direction X. Thus, the article transport facility 100 can more easily lower the cost than the structure including such a third transporter.

In the present embodiment, as shown in FIG. 1, the conveyor device 1 is divisible into a joint unit JU in the joint area JA to connect the first transporter 11, the second transporter 12, and the middle guide 13 to one another, and a far unit FU in the far area FA to connect the first transporter 11 and the second transporter 12 to each other. The middle guide 13 is not included in the far unit FU. This structure may include a known conveyor unit not including the middle guide 13 as the far unit FU. The known conveyor unit includes the first transporter 11 and the second transporter 12 without the middle guide 13. Simply replacing a part of the conveyor device including known conveyor units arranged in the transportation direction X with the joint unit JU including the middle guide 13 can form the above conveyor device 1. Thus, the article transport facility 100 for smoothly transferring the target article 9 from the conveyor device 1 to the support conveying device 2 can be formed at a lower cost.

The article transport facility 100 described above can smoothly transfer the target article 9 between the conveyor device 1 that transports the target article 9 partially bending downward and the support conveying device 2 that supports the target article 9 with a high degree of flatness. In addition, the full length of the middle guide 13 in the transportation direction X is shorter than the full length of each of the first transporter 11 and the second transporter 12 in the transportation direction X. Thus, the middle guide 13 is located in simply a part of the conveyor device 1 including the first transporter 11 and the second transporter 12 in the transportation direction X. As described above, for example, the article transport facility 100 more easily lowers the cost than the structure including a third transporter having the structure similar to that of the first transporter 11 and the second transporter 12 throughout the length of the conveyor device 1 in the transportation direction X between the first transporter 11 and the second transporter 12 in the width direction Y.

OTHER EMBODIMENTS

Article transport facilities according to other embodiments will now be described below.

Figure 8:
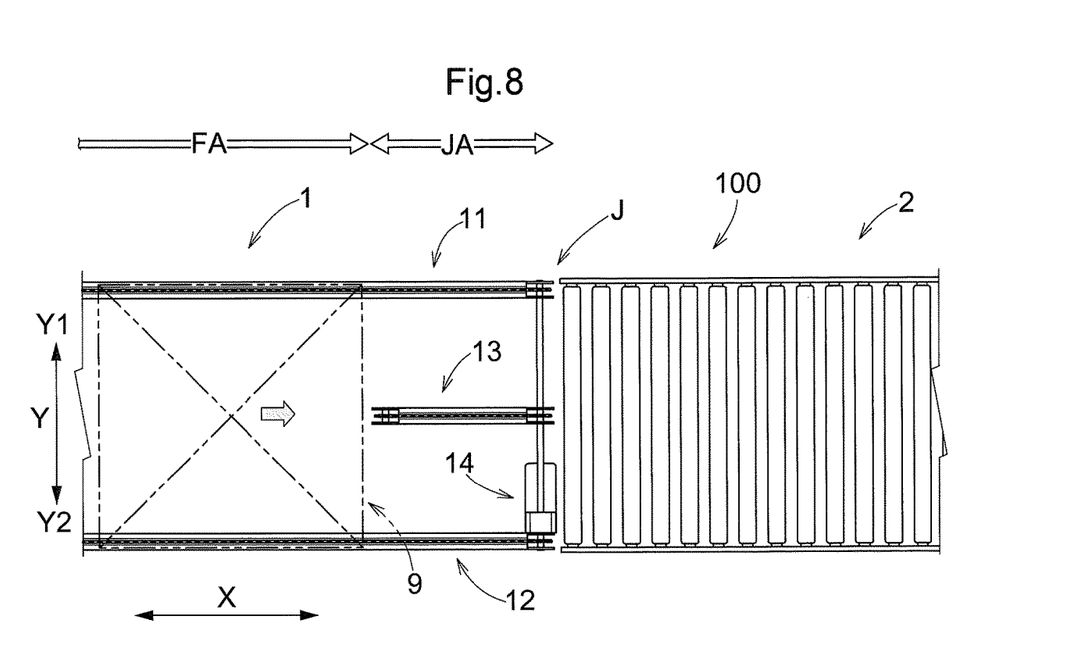
FIG. 8 is a plan view of an article transport facility according to another embodiment.

(1) In the above embodiment, the conveyor device 1 is divisible into the joint unit JU including the first transporter 11, the second transporter 12, and the middle guide 13 connected to one another, and the far unit FU including the first transporter 11 and the second transporter 12 connected to each other. In another example, the conveyor device 1 may be integral instead of being divisible in the transportation direction X. As shown in FIG. 8, for example, the conveyor device 1 may include the first transporter 11 and the second transporter 12 continuously extending throughout them in the transportation direction X. As in the above embodiment, the middle guide 13 may be located in a part of the area in the conveyor device 1 in the transportation direction X, and the full length of the middle guide 13 in the transportation direction X may be shorter than the full length of each of the first transporter 11 and the second transporter 12 in the transportation direction X.

Figure 9:
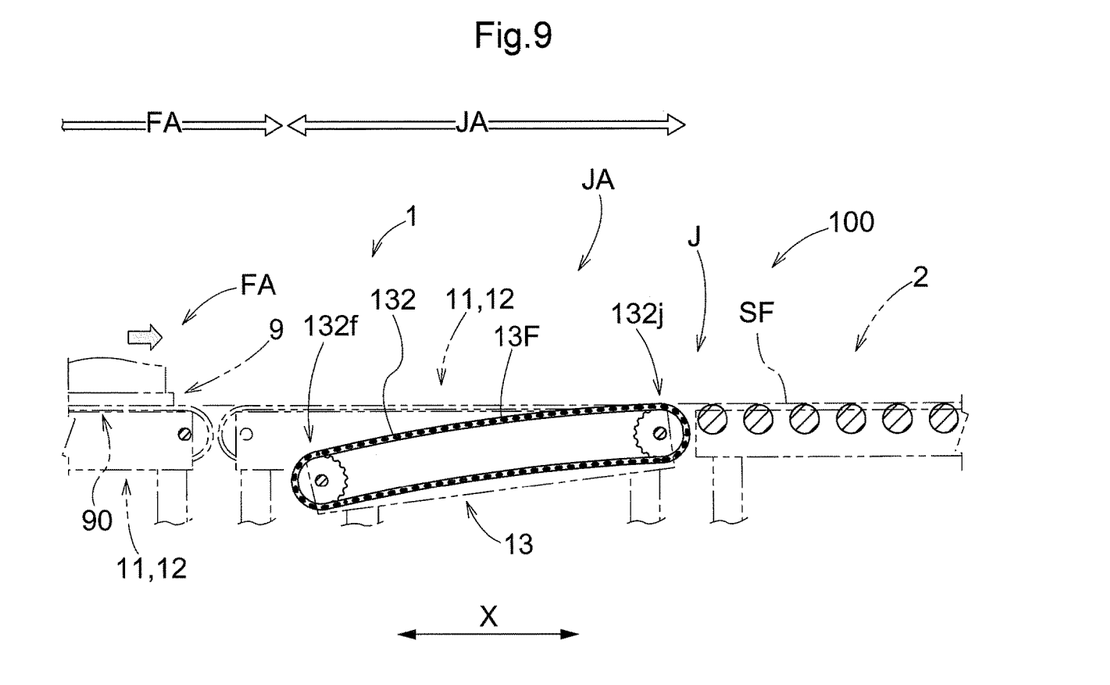
FIG. 9 is a view of a middle guide in another embodiment as viewed in the width direction.

(2) In the above embodiment, the middle guide surface 13F is straight as viewed in the width direction Y (refer to FIG. 6). In another example, as shown in FIG. 9, the middle guide surface 13F may be curved as viewed in the width direction Y. As in the above embodiment, the middle guide surface 13F is inclined further downward from the reference plane SF at a greater distance in the transportation direction X from the joint J. Thus, for example, the middle guide surface 13F may be curved to protrude upward. In this structure, the middle guide 13 may have a shorter length in the transportation direction X while the height of the middle guide surface 13F at the far end 132f is reduced sufficiently.

(3) In the above embodiment, the far end 132f of the middle guide surface 13F is located below the bottom middle portion 93 of the target article 9 bending further downward relative to the bottom first portion 91 and the bottom second portion 92. In another example, the far end 132f of the middle guide surface 13F may be located at the same height as the bottom middle portion 93 of the target article 9 bending downward.

(4) In the above embodiment, the driving device 14 synchronously drives the first transporter 11, the second transporter 12, and the middle guide 13 with the connecting shaft 140 that coaxially connects the first sprocket 111, the second sprocket 121, and the middle sprocket 131 to one another. In another example, the driving device 14 may include a driving unit that separately drives the first transporter 11, the second transporter 12, and the middle guide 13. In some embodiments, the driving device 14 may separately include a driving unit that synchronously drives the first transporter 11 and the second transporter 12, and a driving unit that drives the middle guide 13.

(5) In the above embodiment, the first transporter 11 and the second transporter 12 are chain conveyors. In another example, the first transporter 11 and the second transporter 12 may be belt conveyors. In this case, each rotator is a pully, and each endless body is a belt.

(6) In the above embodiment, the middle guide 13 is a chain conveyor. In another example, the middle guide 13 may be a conveyor other than a chain conveyor, for example, a belt conveyor or a roller conveyor. When the middle guide 13 is a belt conveyor, each rotator is a pully, and the endless body is a belt. When the middle guide 13 is a roller conveyor, the middle guide 13 includes multiple rollers that are arranged in the transportation direction X and that rotate about the rotation axes extending in the width direction Y. In this case, the multiple rollers may have the function of transporting the target article 9 by applying a force in the transportation direction X as being driven by a driving source such as an electric motor, or may not have the transportation function but may have the function of guiding the target article 9 by rotating as the bottom surface 90 of the target article 9 slides.

More specifically, the middle guide 13 may not transport the target article 9 in the transportation direction X.

(7) In the above embodiment, the support conveying device 2 is a roller conveyor. In another example, the support conveying device 2 may transport the target article 9 while supporting the target article 9 with a higher degree of flatness than the conveyor device 1. The support conveying device 2 may be any conveyor or any conveying device that transports the target article 9 in this manner, such as a belt conveyor or a chain conveyor, or an automated guided vehicle or a stacker crane. For example, the support conveying device 2 may have the structure (may be a three-row conveyor) including, in addition to the first transporter 11 and the second transporter 12 in the conveyor device 1, a third transporter (not shown) having the structure similar to that of the first transporter 11 and the second transporter 12 between the first transporter 11 and the second transporter 12 in the width direction Y.

(8) The structure described in each of the above embodiments may be combined with any other structures described in the other embodiments unless any contradiction arises. The embodiments described herein are merely illustrative in all respects and may be modified variously as appropriate without departing from the spirit and scope of the present disclosure.

Overview of Embodiment

Hereafter, the article transport facility will be described.

An article transport facility transports a target article to be transported in a transportation direction. The facility includes a conveyor device that transports the target article, and a support conveying device adjacent to the conveyor device in the transportation direction to transport the target article while supporting the target article with a higher degree of flatness than the conveyor device. The conveyor device includes a first transporter, a second transporter, and a middle guide each extending in the transportation direction and spaced apart from one another in a width direction being a direction perpendicular to the transportation direction in a plan view. The width direction includes a first width direction in which the first transporter is located from the second transporter, and a second width direction opposite to the first width direction. The first transporter transports the target article in the transportation direction while supporting, from below, a bottom first portion of a bottom surface of the target article, and the bottom first portion is a portion of the bottom surface in the width direction. The second transporter transports the target article in the transportation direction while supporting, from below, a bottom second portion of the bottom surface of the target article, and the bottom second portion is a portion of the bottom surface located in the second width direction from the bottom first portion. The middle guide has a full length in the transportation direction shorter than a full length of each of the first transporter and the second transporter in the transportation direction. The middle guide is located between the first transporter and the second transporter in the width direction in an area of the conveyor device extending in the transportation direction including a joint connecting to the support conveying device to guide a bottom middle portion of the bottom surface, and the bottom middle portion is a portion of the bottom surface between the bottom first portion and the bottom second portion in the width direction. The first transporter has a first support surface to support the bottom first portion, and the second transporter has a second support surface to support the bottom second portion. The first support surface and the second support surface are located in a same reference plane. The middle guide has a middle guide surface to guide the bottom middle portion, and the middle guide surface is located in the reference plane at the joint and inclined further downward from the reference plane at a greater distance in the transportation direction from the joint.

In the conveyor device including the first and second transporters described above, the middle bottom surface of the target article is supported by neither the first support surface of the first transporter nor the second support surface of the second transporter. Thus, depending on, for example, the weight or the strength of the target article, the bottom middle portion may bend downward below the reference plane including the first and second support surfaces. In this structure, the middle guide surface that guides the bottom middle portion is inclined further downward from the reference plane at a greater distance in the transportation direction from the joint in the conveyor device connecting to the support conveying device. When the target article moves over the conveyor device toward the support conveying device, the bottom middle portion of the target article comes in contact with the middle guide surface at a predetermined distance apart from the joint, and is gradually pressed upward as moving toward the joint. At the joint, the middle guide surface is located in the reference plane as the first and second support surfaces. Thus, when the target article passes the joint, the bottom middle portion is unbent. The article transport facility with this structure for transporting the target article while supporting the target article from below can thus smoothly transfer the target article between the conveying device that transports the target article partially bending downward and the conveying device that supports the target article with a high degree of flatness.

In this structure, the middle guide has a full length in the transportation direction shorter than the full length of each of the first and second transporters in the transportation direction. Thus, the middle guide is located simply partially in the conveyor device including the first and second transporters in the transportation direction. This structure more easily lowers the cost than, for example, a structure that includes a third transporter having the structure similar to that of the first and second transporters and located throughout the length of the conveyor device in the transportation direction between the first and second transporters in the width direction.

The middle guide surface may have a far end being an end farthest from the joint in the transportation direction, and the far end may be located below the bottom middle portion of the target article when the target article supported by the first transporter and the second transporter has the bottom middle portion bending downward relative to the bottom first portion and the bottom second portion.

In this structure, the bottom middle portion of the target article transported toward the support conveying device first comes in contact with a portion of the middle guide surface nearer the joint than the far end, or in other words, an inclined portion of the middle guide surface. The bottom middle portion of the target article bending downward can thus be guided appropriately.

The middle guide may transport the target article in the transportation direction while supporting the bottom middle portion from below.

When the bottom middle portion of the target article is guided in the transportation direction while being in contact with the middle guide surface of the middle guide, the bottom middle portion is pressed by the middle guide surface, and thus resistance may occur in the direction to obstruct transportation of the target article. In this structure, in addition to the first and second transporters, the middle guide also transports the article in the transportation direction. Thus, the target article can be transported more smoothly.

When the middle guide transports the target article in the transportation direction while supporting the bottom middle portion from below, each of the first transporter, the second transporter, and the middle guide may include a pair of rotators spaced apart from each other in the transportation direction and rotatable about rotation axes extending in the width direction, and an endless body wound around the pair of rotators and extending in the transportation direction. The conveyor device may include a driving device that drives the first transporter, the second transporter, and the middle guide. The driving device may include a connecting shaft coaxially connecting the rotators of the first transporter, the second transporter, and the middle guide located at ends nearer the joint to one another, and a driver that drives the connecting shaft to rotate.

The first support surface, the second support surface, and the middle guide surface are located in the reference plane at the joint. Thus, one of the rotators of the pair in the first transporter, one of the rotators of the pair in the second transporter, and one of the rotators of the pair in the middle guide located at the end nearer the joint are easily located to overlap one another as viewed in the width direction. In this structure, the connecting shaft coaxially connects these three rotators in the first transporter, the second transporter, and the middle guide to one another based on the relative positions of the rotators.

This structure can thus synchronously drive the first transporter, the second transporter, and the middle guide by driving the connecting shaft to rotate with the driver and can simplify the structure of the driving device.

The conveyor device may include a joint area in the transportation direction in which the middle guide is located, and a far area located farther from the joint than the joint area. The conveyor device may be divisible into a joint unit located in the joint area in which the first transporter, the second transporter, and the middle guide are connected to one another, and a far unit located in the far area in which the first transporter and the second transporter are connected to each other.

This structure may include a known conveyor unit not including the middle guide as the far unit. Simply replacing a part of the conveyor device including known conveyor units arranged in the transportation direction with the joint unit including the middle guide can form the above conveyor device. Thus, the article transport facility for smoothly transferring the target article from the conveyor device to the support conveying device can be formed at a lower cost.

The support conveying device may be a roller conveyor including a plurality of rollers extending throughout an area of the bottom surface of the target article in the width direction. The plurality of rollers may be rotatable about rotation axes extending in the width direction and may be arranged adjacent to one another in the transportation direction.

This structure can transport the target article with a higher degree of flatness using the support conveying device. When the target article is transported with a higher degree of flatness, various operations are easily performed on the target article such as picking using a robot or inspection including the image recognition operation.

The middle guide may be a chain conveyor, a belt conveyor, or a roller conveyor.

This structure can form the structure of the middle guide with a known conveyor.

This lowers the cost.

Each of the first transporter and the second transporter may be a chain conveyor or a belt conveyor.

The chain conveyor or the belt conveyor can transport the target article while causing greater friction with the bottom surface of the target article than another conveyor such as a roller conveyor. Thus, this structure can appropriately transport the target article with fewer slips while guiding the bottom middle portion with the middle guide during transportation of the target article.

INDUSTRIAL APPLICABILITY

The technique described in the present disclosure is applicable to an article transport facility that transports a target article in a transportation direction.

REFERENCE SIGNS LIST 100 article transport facility
1 conveyor device
11 first transporter
11F first support surface
112 chain
12 second transporter
122 chain
12F second support surface
13 middle guide
132 chain
132f far end
13F middle guide surface
14 driving device
140 connecting shaft
14m driver
2 support conveying device
21 roller
9 target article
90 bottom surface
91 bottom first portion
92 bottom second portion
93 bottom middle portion
FA far area
FU far unit
J joint
JA joint area
JU joint unit
SF reference plane
X transportation direction
Y width direction
Y1 first width direction
Y2 second width direction

The invention claimed is:

1. An article transport facility for transporting a target article to be transported in a transportation direction, the facility comprising:
a conveyor device configured to transport the target article; and
a support conveying device adjacent to the conveyor device in the transportation direction, the support conveying device configured to transport the target article while supporting the target article with a higher degree of flatness than the conveyor device,
wherein:
the conveyor device comprises a first transporter, a second transporter, and a middle guide each extending in the transportation direction and spaced apart from one another in a width direction that is a direction perpendicular to the transportation direction in a plan view,
the width direction includes a first width direction in which the first transporter is located from the second transporter, and a second width direction opposite to the first width direction,
the first transporter transports the target article in the transportation direction while supporting, from below, a bottom first portion of a bottom surface of the target article, and the bottom first portion is a portion of the bottom surface in the width direction, the second transporter transports the target article in the transportation direction while supporting, from below, a bottom second portion of the bottom surface of the target article, and the bottom second portion is a portion of the bottom surface located in the second width direction from the bottom first portion, the middle guide has a full length in the transportation direction shorter than a full length of each of the first transporter and the second transporter in the transportation direction, the middle guide is located between the first transporter and the second transporter in the width direction in an area of the conveyor device extending in the transportation direction including a joint connecting to the support conveying device to guide a bottom middle portion of the bottom surface, and the bottom middle portion is a portion of the bottom surface between the bottom first portion and the bottom second portion in the width direction, the first transporter has a first support surface to support the bottom first portion, the second transporter has a second support surface to support the bottom second portion, and the first support surface and the second support surface are located in a same reference plane, the middle guide has a middle guide surface to guide the bottom middle portion, and the middle guide surface is located in the reference plane at the joint and inclined further downward from the reference plane at a greater distance in the transportation direction from the joint, and the middle guide surface has a far end that is an end farthest from the joint in the transportation direction, and the far end is located below the bottom middle portion of the target article when the target article supported by the first transporter and the second transporter has the bottom middle portion bending downward relative to the bottom first portion and the bottom second portion.

2. The article transport facility according to claim 1, wherein:
the middle guide transports the target article in the transportation direction while supporting the bottom middle portion from below.

3. The article transport facility according to claim 2, wherein:
each of the first transporter, the second transporter, and the middle guide comprises a pair of rotators spaced apart from each other in the transportation direction and rotatable about rotation axes extending in the width direction, and an endless body wound around the pair of rotators and extending in the transportation direction,
the conveyor device comprises a driving device configured to drive the first transporter, the second transporter, and the middle guide, and
the driving device comprises a connecting shaft coaxially connecting the rotators of the first transporter, the second transporter, and the middle guide located at ends nearer the joint to one another, and a driver configured to drive the connecting shaft to rotate.

4. The article transport facility according to claim 1, wherein:
the support conveying device is a roller conveyor comprising a plurality of rollers extending throughout an area of the bottom surface of the target article in the width direction, and the plurality of rollers are rotatable about rotation axes extending in the width direction and are arranged adjacent to one another in the transportation direction.

5. The article transport facility according to claim 1, wherein:
the middle guide is a chain conveyor, a belt conveyor, or a roller conveyor.

6. The article transport facility according to claim 1, wherein:
each of the first transporter and the second transporter is a chain conveyor or a belt conveyor.

7. An article transport facility for transporting a target article to be transported in a transportation direction, the facility comprising:
a conveyor device configured to transport the target article; and
a support conveying device adjacent to the conveyor device in the transportation direction, the support conveying device configured to transport the target article while supporting the target article with a higher degree of flatness than the conveyor device,
wherein:
the conveyor device comprises a first transporter, a second transporter, and a middle guide each extending in the transportation direction and spaced apart from one another in a width direction that is a direction perpendicular to the transportation direction in a plan view,
the width direction includes a first width direction in which the first transporter is located from the second transporter, and a second width direction opposite to the first width direction,
the first transporter transports the target article in the transportation direction while supporting, from below, a bottom first portion of a bottom surface of the target article, and the bottom first portion is a portion of the bottom surface in the width direction,
the second transporter transports the target article in the transportation direction while supporting, from below, a bottom second portion of the bottom surface of the target article, and the bottom second portion is a portion of the bottom surface located in the second width direction from the bottom first portion,
the middle guide has a full length in the transportation direction shorter than a full length of each of the first transporter and the second transporter in the transportation direction,
the middle guide is located between the first transporter and the second transporter in the width direction in an area of the conveyor device extending in the transportation direction including a joint connecting to the support conveying device to guide a bottom middle portion of the bottom surface, and the bottom middle portion is a portion of the bottom surface between the bottom first portion and the bottom second portion in the width direction,
the first transporter has a first support surface to support the bottom first portion, the second transporter has a second support surface to support the bottom second portion, and the first support surface and the second support surface are located in a same reference plane,
the middle guide has a middle guide surface to guide the bottom middle portion, and the middle guide surface is located in the reference plane at the joint and inclined further downward from the reference plane at a greater distance in the transportation direction from the joint, the conveyor device includes a joint area in the transportation direction in which the middle guide is located, and a far area located farther from the joint than the joint area, and the conveyor device is divisible into a joint unit located in the joint area in which the first transporter, the second transporter, and the middle guide are connected to one another, and a far unit located in the far area in which the first transporter and the second transporter are connected to each other.

* * * * *